United States Patent
Bruschi et al.

(10) Patent No.: US 9,680,308 B2
(45) Date of Patent: Jun. 13, 2017

(54) BIDIRECTIONAL DEMAND RESPONSE CONTROL

(75) Inventors: Paul J. Bruschi, Princeton Junction, NJ (US); Sindhu Suresh, Monroe Township, NJ (US)

(73) Assignee: SIEMENS AKTIENGESELLSCHAFT, München (DE)

(*) Notice: Subject to any disclaimer, the term of this patent is extended or adjusted under 35 U.S.C. 154(b) by 774 days.

(21) Appl. No.: 14/114,307

(22) PCT Filed: May 14, 2012

(86) PCT No.: PCT/US2012/037705
§ 371 (c)(1),
(2), (4) Date: Oct. 28, 2013

(87) PCT Pub. No.: WO2012/161993
PCT Pub. Date: Nov. 29, 2012

(65) Prior Publication Data
US 2014/0062195 A1    Mar. 6, 2014

Related U.S. Application Data

(60) Provisional application No. 61/488,392, filed on May 20, 2011.

(51) Int. Cl.
H02J 3/06 (2006.01)
H02J 4/00 (2006.01)
(Continued)

(52) U.S. Cl.
CPC ...... *H02J 4/00* (2013.01); *B60L 3/12* (2013.01); *B60L 11/184* (2013.01);
(Continued)

(58) Field of Classification Search
CPC .... H02J 4/00; H02J 3/06; H02J 13/002; H02J 13/0075
(Continued)

(56) References Cited

U.S. PATENT DOCUMENTS 6,774,506 B2    8/2004    Hashimoto et al.
2003/0052542 A1   3/2003    Hashimoto et al.
(Continued)

FOREIGN PATENT DOCUMENTS

| EP | 1 294 071 A2 | 3/2003 |
|---|---|---|
| WO | 2004/079549 A2 | 9/2004 |
| WO | 2011/012134 A1 | 2/2011 |

OTHER PUBLICATIONS

International Search Report dated May 10, 2013.

*Primary Examiner* — Rexford Barnie
*Assistant Examiner* — Terrence Willoughby

(57) ABSTRACT

A method for managing allocation of electrical power includes selecting one or more power consuming entities for receiving a request to reduce electrical power usage (S23) based on data pertaining to past selections of entities for receiving requests to reduce power and a history of compliance with said requests (S22). A customized request to reduce power usage for each of the selected one or more power consuming entities is generated (S24). The generated customized request to reduce power usage is received at a corresponding power consuming entity and a cost associated with complying with the received customized request to reduce power usage is evaluated (S25). A commitment to comply with the received customized request to reduce power usage is returned when the evaluated cost is within a threshold of acceptability and negotiating a new request to reduce power when the evaluated cost is greater than a threshold of acceptability (S26).

18 Claims, 3 Drawing Sheets

(51) Int. Cl.
    *B60L 11/18*      (2006.01)
    *B60L 3/12*       (2006.01)
    *G06Q 50/06*      (2012.01)
    *H02J 13/00*      (2006.01)
    *H02J 3/14*       (2006.01)

(52) U.S. Cl.
    CPC ....... *B60L 11/1842* (2013.01); *B60L 11/1844* (2013.01); *B60L 11/1846* (2013.01); *H02J 3/06* (2013.01); *H02J 13/0075* (2013.01); *B60L 2230/40* (2013.01); *B60L 2240/66* (2013.01); *B60L 2240/72* (2013.01); *B60L 2240/80* (2013.01); *B60L 2260/54* (2013.01); *G06Q 50/06* (2013.01); *H02J 13/002* (2013.01); *H02J 13/0082* (2013.01); *H02J 2003/146* (2013.01); *Y02E 60/721* (2013.01); *Y02E 60/7815* (2013.01); *Y02E 60/7853* (2013.01); *Y02T 10/7005* (2013.01); *Y02T 10/7088* (2013.01); *Y02T 10/7291* (2013.01); *Y02T 10/92* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01); *Y04S 40/121* (2013.01); *Y04S 40/126* (2013.01); *Y10T 307/461* (2015.04)

(58) Field of Classification Search
    USPC .......................................................... 307/38
    See application file for complete search history.

(56) References Cited

U.S. PATENT DOCUMENTS

| | | |
|---|---|---|
| 2003/0189420 A1 | 10/2003 | Hashimoto et al. |
| 2008/0040479 A1 | 2/2008 | Bridge et al. |
| 2008/0281663 A1 | 11/2008 | Hakim et al. |
| 2014/0062195 A1 | 3/2014 | Bruschi et al. |

BIDIRECTIONAL DEMAND RESPONSE CONTROL

CROSS-REFERENCE TO RELATED APPLICATION

The present application is based on provisional application Ser. No. 61/488,392, filed May 20, 2011, the entire contents of which are herein incorporated by reference.

BACKGROUND OF THE INVENTION

1. Technical Field

The present disclosure relates to demand response control and, more specifically, to a system and method for bidirectional demand response control.

2. Discussion of Related Art

The independent system operator (ISO) is a central authority manages how power is generated, transmitted and distributed. The ISO may manage scheduling and pricing of power and may ensure that the power demanded at any given moment is no greater than available power.

At certain times when power demand peaks, for example, during particularly hot days in which air conditioner usage is exceptional, the ISO may have trouble satisfying power demand. In such instances, rolling blackouts, in which power is intentionally cut to various geographic regions for a fixed period of time, may be used as a last resort to prevent damage to the power generation/distribution system and/or wide-spread power outages. As rolling blackouts may cut power to customers without regard to the urgency with which power is required, rolling blackouts may adversely affect health, property, and profitability to a greater extent than is necessary.

To limit the necessity for rolling blackouts, many ISOs employ demand response (DR) programs. Power customers may participate in DR programs on a voluntary basis by signing an agreement with the ISO by which the customer agrees to shed a quantity of electrical load upon the request of the ISO. The request for the curtailment of power is known as a demand, and accordingly, the shedding of power load by the customer is known as a demand response (DR). The manifestation of a request for the curtailment of power may be known as a DR event.

Existing DR programs generally involve a representative of the ISO contacting a representative of each power customer with instructions to shed a quantity of electrical load. The customer would then be expected to curtail power usage accordingly. Penalties for failure to accommodate the demand of the ISO to shed electrical load may be relatively light when measured against the potential loss associated with curtailing power usage and accordingly, it is common for participating customers to fail to fulfill their contractual obligations to satisfy the DR event.

To accommodate non-compliance, the ISO may issue requests for the curtailment of power utilization to more customers and to greater extents than is actually necessary. This may result in inefficiency as more customers may be contractually obligated to shed greater amounts of electrical load than is actually necessary to align electrical supply and demand. Moreover, as certain customers may continuously fail to meet their contractual obligations as other customers consistently take the necessary actions to satisfy the DR events, these DR programs may be unfair.

SUMMARY

A method for managing allocation of electrical power includes selecting one or more power consuming entities for receiving a request to reduce electrical power usage based on data pertaining to past selections of entities for receiving requests to reduce power and a history of compliance with said requests. A customized request to reduce power usage for each of the selected one or more power consuming entities is generated. The generated customized request to reduce power usage is received at a corresponding power consuming entity. A cost associated with complying with the received customized request to reduce power usage is evaluated. A commitment to comply with the received customized request to reduce power usage is returned when the evaluated cost is within a threshold of acceptability and negotiating a new request to reduce power when the evaluated cost is greater than a threshold of acceptability.

The request to reduce electrical power usage may include a request to curtail electrical consumption, to generate power independently, and/or to store electrical power at a first time and to release the stored electrical power at a second time that is later than the first time.

Electrical power demand may be forecasted and an insufficiency of available electrical power may be identified based on a forecasted demand and operating market conditions. Forecasting the electrical power demand may be performed using statistical data concerning past electrical power demand and forecasts concerning factors that affect power usage. The forecasts concerning factors that affect power usage may include a weather forecast or economic conditions.

Forecasting the electrical power demand may be performed automatically by a computer system based on data from a database of statistical data concerning past electrical power demand and recent weather report information retrieved over the Internet.

The commitment to comply with the request or the negotiated new request may be executed by curtailing power utilization, independently generating power, or storing and releasing power. Execution of the commitment or the negotiated new request may include storing power within one or more electrical vehicles and releasing the stored power for general use.

The request to reduce electrical power usage may include a request for the corresponding power consuming entity to become, for a predetermined period of time, a net power producing entity. The data pertaining to past selections of entities for receiving requests to reduce power and a history of compliance with the requests may be retrieved from a database.

Generating the customized request to reduce power for each of the selected one or more power consuming entities may be performed automatically using a computer system.

The generated requests to reduce power for each of the selected one or more power consuming entities may be transmitted in encoded form over an electronic network.

The evaluating of the cost associated with complying with the received customized request to reduce power may be performed automatically by a computer system.

The negotiating the new request to reduce power when the evaluated cost is greater than a threshold of acceptability may be performed automatically and electronically using a bidirectional line of data communication.

The generated customized request to reduce power may include a quantity of load to shed or a maximum load utilization as a function of time. The returned commitment may include a strategy for meeting the received customized request to reduce power.

A system for managing allocation of electrical power includes an aggregator for receiving a request for power load reduction. The aggregator includes a demand response management system (DRMS) for evaluating the received request for power load reduction and generating one or more demand response (DR) events for requesting power load reduction at one or more participant sites. A database stores historic performance and program parameters, the DRMS generating the one or more DR events based on the historic performance and program parameters retrieved from the database. At least one DRMS site controller is located at least one participant site for receiving the DR event, negotiating terms of power reduction with the aggregator, returning a commitment to the aggregator to shed a particular load, and executing the load shedding commitment.

The DRMS site controller may include a DR event evaluator for receiving the DR event, consulting a database of enrolled programs, verifying legitimacy of the received DR event, and/or passing along legitimate DR events. The DRMS site controller may include a decision selector for determining how to satisfy the DR event or how to negotiate for modifications to the DR event. The DRMS site controller may include a load selector for determining how to shed power demand, generate additional power, and/or retrieve stored power at the corresponding participant site.

The DRMS may receive statistical data concerning past electrical power demand and/or forecasts concerning factors that affect power usage for forecasting electrical power demand.

A computer system includes a processor and a non-transitory, tangible, program storage medium, readable by the computer system, embodying a program of instructions executable by the processor to perform method steps for managing allocation of electrical power. The method includes selecting one or more power consuming entities for receiving a request modify electrical power usage, generation or retrieval. A customized request to modify electrical power usage, generation or retrieval for each of the selected one or more power consuming entities is generated. The generated customized request is received at a corresponding power consuming entity. A cost associated with complying with the received customized request is evaluated. A commitment to comply with the received customized request is returned when the evaluated cost is within a threshold of acceptability and negotiating a new request to modify electrical power usage, generation or retrieval when the evaluated cost is greater than a threshold of acceptability.

Selecting the one or more power consuming entities for receiving the request may be based on data pertaining to past selections of entities for receiving requests to reduce power and a history of compliance with said requests.

The returned commitment may include a strategy for meeting the received customized request.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
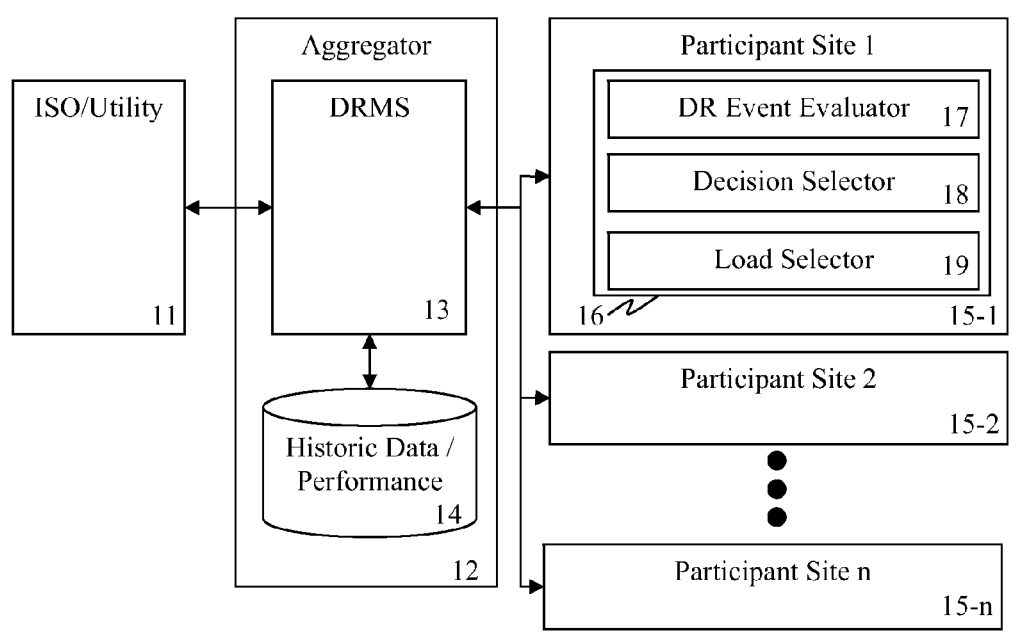
FIG. 1 is a schematic diagram illustrating a system for performing DR control according to exemplary embodiments of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention provide a system and method for performing demand response (DR) control in which bidirectional negotiation between an independent system operator (ISO) managing a power supply network and one or more participating power customers is automatically conducted so that a desired level of electrical load may be shed from the power supply network in an efficient and fair manner.

Additionally, exemplary embodiments of the present invention may provide the ISO the ability to automatically negotiate the storage, release and independent generation of power within the facilities of the one or more participating power customers.

FIG. 1 is a schematic diagram illustrating a system for performing DR control according to exemplary embodiments of the present invention. An ISO or utility 11 may generate or otherwise receive a forecast for energy demand. The energy demand forecast may be determined, for example, based on historic data, current trends, and observable or forecasted external factors such as weather. The ISO or utility 11 may determine the quantity of available energy from the power generators under its control and/or authority. When the ISO or utility 11 determines that the forecasted energy demand exceeds the determined quantity of available energy, it may issue a call for load reduction in an amount equal to the deficiency.

The call for load reduction may be passed to an aggregator 12. The aggregator may be embodied as a computer system such as one or more servers executing various programs of instructions. The aggregator 12 may be located at a facility of the ISO/utility 11 or may be remotely hosted. The responsibility of the aggregator 12 is to interpret the call for load reduction and generate one or more DR events. The DR events may include requests for a particular participant of the DR program to shed a particular quantity of load. In generating the DR events, the aggregator 12 may utilize a demand response management system (DRMS) 13. The DRMS 13 may include the logic necessary to evaluate the call for load reduction received by the ISO/utility 11 and to create and distribute the DR events to the one or more participant sites 15-1, 15-2, . . . , 15-n. The DRMS 13 may be embodied as one or more software modules executing on the aggregator 12 or the DRMS 13 may be a distinct hardware element in communication with the aggregator 12. The DRMS 13 may recall historic performance and program parameters from a database 14. This database may, according to one exemplary embodiment of the present invention, be embodied within the aggregator 12.

Historic performance may be information pertaining to the history of DR events sent to each participant and that participant's history of responding to the DR events and meeting its past load shedding obligations. The parameters may include practical information such as statistics pertaining to the energy usage and flexibility of each participant and various other factors that may relate to the ability of the corresponding participant to shed load upon request. Additionally, the parameters may include information pertaining to the ability of corresponding participants to offset load usage by independent generation of power or by the use on onsite storage and retrieval of power.

By utilizing this information from the database 14, the DRMS 13 may be able to generate DR events that have a high likelihood of successful execution and a high degree of equitability among the many participants. In this way, the aggregator 12 may be able to avoid having to issue DR events to reduce more load than is truly required as each DR event has a greater likelihood of successful execution than those of other approaches.

Each generated DR event may be sent from the aggregator 12 to the one or more participant sites 15-1, 15-2, . . . , 15-n. Each participant site may have a similar structure for accommodating DR events and accordingly, only the structure of participant site 15-1 will be described. It is to be understood that the other participant sites may have identical or similar structures.

The participant site 15-1 may include a DRMS site controller 16. The responsibility of the DRMS site controller 16 is to receive and evaluate DR events, determine the capacities and flexibilities of the corresponding participant site, negotiate the DR events, where necessary, return a commitment to the aggregator 12 to shed a particular load, generate a particular quantity of power, store and/or retrieve a quantity of power. The DRMS site controller may also be responsible for optimizing a strategy for meeting the load shedding commitment and executing the load shedding commitment. The DRMS site controller 16 may be embodied as a computer system, for example, one or more servers executing various programs of instructions. The servers may be located either within the confines of the participant site 15-1 or may be remotely hosted.

The DR event may detail a quantity of load to shed or maximum load utilization as a function of time. Additionally, or alternatively, the DR event may detail a quantity of electrical power to be supplied by the corresponding site, by either power generation or the release of stored power, and a time frame in which the power is to be supplied. For example, the DR event may ask that a particular quantity of power be provided by the site from independent generation of electricity or the DR event may ask that a site charge batteries or other electrical storage devices at a first time and then release the stored electrical power at a second time. This release of stored electrical power may be used to offset the power needs of that particular site or the released electrical power may be sent back onto the power grid for use by other sites. In this way, the DR event may request that a particular site become a net producer of power for a limited time. According to one exemplary embodiment of the present invention, a site may utilize a fleet of electrical vehicles to store and release power. However, a site may utilize independent generation of power either from renewable resources such as wind turbines, photovoltaic cells, kinetic hydro power generators, etc. or the site may utilize independent generation of power from fossil fuel sources such as natural gas or petroleum-based fuels.

The DR event may provide for various degrees of load shedding/offsetting at various times. Where the DR event details maximum load utilization, this information may be represented, for example, as a number of kilowatts/megawatts that must not be exceeded by the participant site for various times. Where the DR event details a quantity of load to shed, the baseline used may be either a quantification of current or forecasted energy usage. The DR event may also detail a peak load utilization that must not be exceeded, regardless of time of day, for the span of the period in question, which may be, for example, one day.

The DRMS site controller 16 according to exemplary embodiments of the present invention may determine an optimal strategy for satisfying the DR event. If satisfaction of the DR event in its entirety is either not possible or prohibitively expensive, the DRMS site controller 16 may negotiate the DR event with the aggregator 12. Negotiation may include the DRMS 16 informing the aggregator 12 what portions of the DR event may be easily accommodated and what portions of the DR event are problematic. The DRMS 16 may also provide the aggregator 12 with an indication of how problematic various aspects of the DR event may be so that the aggregator 12 can efficiently reduce load and/or offset load with power generation/release of stored power across all participant sites in a least disruptive manner.

Negotiation between the DRMS site controller 16 and the aggregator 12 may be implemented, for example, by the sending and receiving of electronic communications between the DRMS 13 and the DRMS site controller 16. These electronic communications may be carried accords a dedicated line of communication or over a wide area network (WAN), for example, over the Internet. The electronic communications may be encrypted and/or digitally signed to maintain security and integrity. Negotiation may be performed automatically and need not involve human intervention. Negotiation may include, for example, a message sent from the DRMS site controller 16 to the DRMS 13 that the DR event is not accepted and an alternative proposal may be provided. The DRMS 13 may then return an acceptance of the counter proposal or an insistence upon the original terms of the DR event, as the needs require.

When negotiations between the DRMS site controller 16 and the aggregator 12 are complete, the DRMS site controller 16 will return a commitment to the aggregator 12. The commitment may indicate the extent of load to be shed, generated, stored and released, etc., and/or peak load thresholds over various periods of time. Where the negotiated commitment falls short of the original DR event, the aggregator 12 may make up for this shortfall in DR events issued to other participants. Conversely, where the DRMS site controller 16 accepts the DR event, it may remain a possibility that the aggregator 12 issues a revised DR event to the DRMS site controller 16, for example, to make up for a shortfall with in other DR events to other participants.

The DRMS site controller 16 may include a DR event evaluator 17 for receiving the DR event, consulting the database of enrolled programs, verifying the legitimacy of the DR event, and passing along legitimate DR events to a decision selector 18. The decision selector 18 may determine how best to satisfy the DR event or in the alternative, how to negotiate for modifications to the DR event, where necessary. As failure to satisfy the entire DR event may have consequences such as assessment of fines, the decision selector 18 may take into consideration the cost of shedding load under present conditions and the applicable fines.

The decision selector 18 may have several options in determining how best to satisfy the DR event and/or what new DR event to negotiate for. The decision selector 18 may reduce load, bring alternative power generation means online, or utilize available energy storage facilities to reduce load demand at certain times by increasing load demand at more convenient times. The decision selector may refer to a load selector 19 to determine how and from where load may be reduced.

The decision selector 18 may be aware of the full range of available power generation means and energy storage facilities at the disposal of the participant site. For example, the participant site may have oil or gas electrical generators and/or renewable energy generators such as photovoltaic cells or wind turbines. The cost and availability of each means of power generation may be known to the decision selector 18 so that an optimum plan for DR event fulfillment may be devised. The decision selector 18 may be embodied as a software optimization engine.

Energy storage facilities available to the participant may include hot water tanks, batteries, and the like. These energy storage facilities may include, for example, a fleet of electric vehicles which may be charged at particular times. The fleet of electrical vehicles may also be used to discharge stored energy back to the participant site for general use and this capability may be known to the decision selector 18 in its operation. The decision selector 18 may have information pertaining to the electric vehicles at the participant site.

The decision selector 18 may accordingly optimize the amount of load reduction that may be met at the corresponding participant site 15-1 by the combination of using distributed power generation, electric vehicles, and load. The decision selector 18 may generate various different load reduction strategies and may provide these strategies to a load selector 19 to address the DR event.

The load selector 19 may be used by the DRMS site controller 16 to determine how much load may reasonably be shed by the participant site 15-1. The load selector 19 may accordingly be consulted during negotiation of the DR event. The load selector 19 may select a preferred load reduction strategy from among those provided by the decision selector 18 and the so selected load reduction strategy may be used in negotiating the DR event and in implementing the commitment.

The DR event evaluator 17, the decision selector 18, and the load selector 19 may each be embodied as programs of instruction executing within or in association with the DRMS site controller 16. The database of enrolled programs may also be located within or in association with the DRMS site controller 16.

Figure 2:
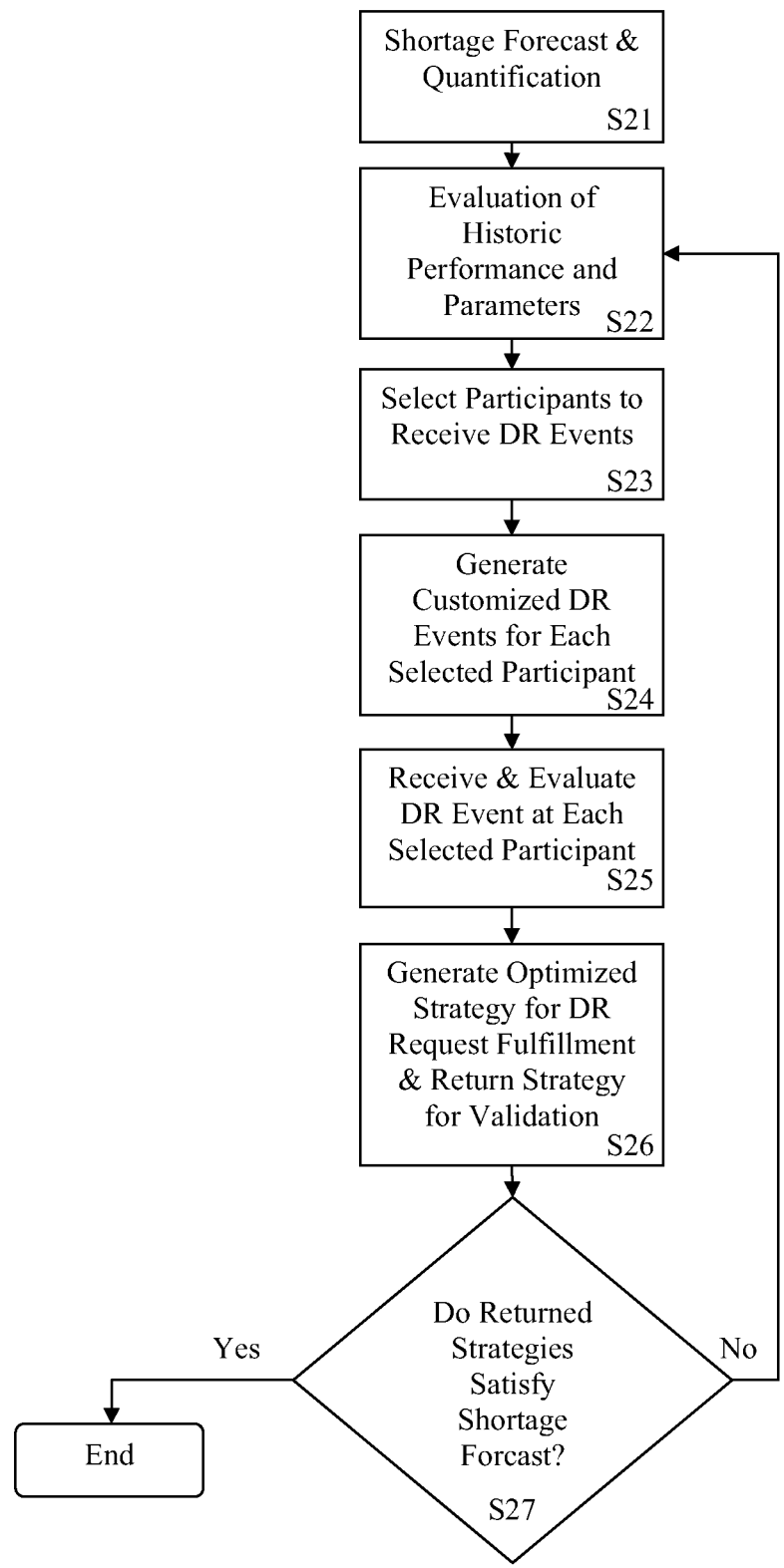
FIG. 2 is a flow chart illustrating a method for implementing bidirectional demand response control according to an exemplary embodiment of the present invention.

FIG. 2 is a flow chart illustrating a method for implementing bidirectional demand response control according to an exemplary embodiment of the present invention. First, power shortage may be forecast for a particular time block (Step S21). For example, power usage may be forecast for the following day. As discussed above, external data such as weather reports may be considered in association with statistical data collected over a length of time to produce the forecast. The power usage forecast may be compared against a quantity of available power to determine the shortage. These calculations may be performed, for example, by the ISO or utility.

After the power shortage has been forecast, a process for satisfying the shortage may begin with evaluation of historic performance and parameters (Step S22). The historic performance and parameters may be used to select one or more participants to receive DR events (Step S23). Selection of the participants to receive the DR event may be based in part on the quantity and nature of past DR events sent to each participant and the prior history of each participant for successfully meeting their load shedding obligations.

Customized DR events may be generated for each selected participant (Step S24). The customized DR events are customized for each particular participant based on data relating to the capacities of the participant to shed load and the cost associated with doing so. Customization of the DR events may be performed, for example, by the DRMS 13 in the manner discussed above. The customized DR events may be received and evaluated by the respective participants (Step S25). Evaluation of the DR event may include determining the authenticity and integrity of the DR request and comparing the DR request against the power needs of the participant and the costs of power curtailment, generation, storage, etc. Where desired, the participant may initiate negotiation with the aggregator over the terms of the DR event. In this way, demand response control may be bidirectional. After a mutually acceptable DR event has been negotiated, the participant may send a commitment for the amount of power curtailment to be fulfilled.

The participant may generate an optimized strategy for DR event fulfillment (Step S26). The optimized strategy may make use of various tools at the disposal of the participant, such as independent power generation, power storage and release, for example, using electric vehicles, and abatement. The optimized strategy may be generated in conjunction with the evaluation of the DR event evaluation and/or negotiation so that the costs associated with DR event fulfillment may be understood prior to commitment. The generated optimized strategy may be returned to the aggregator for validation. This step may be part of the sending of the commitment.

The aggregator may then determine whether the commitments and/or optimized strategies received from the various participants satisfy the shortage forecast (Step S27). Where they do not (No, Step S27), the process may be repeated to generate additional DR events or modify existing DR events. Where the forecasted shortage is satisfied (Yes, Step S27), the process may be ended.

Figure 3:
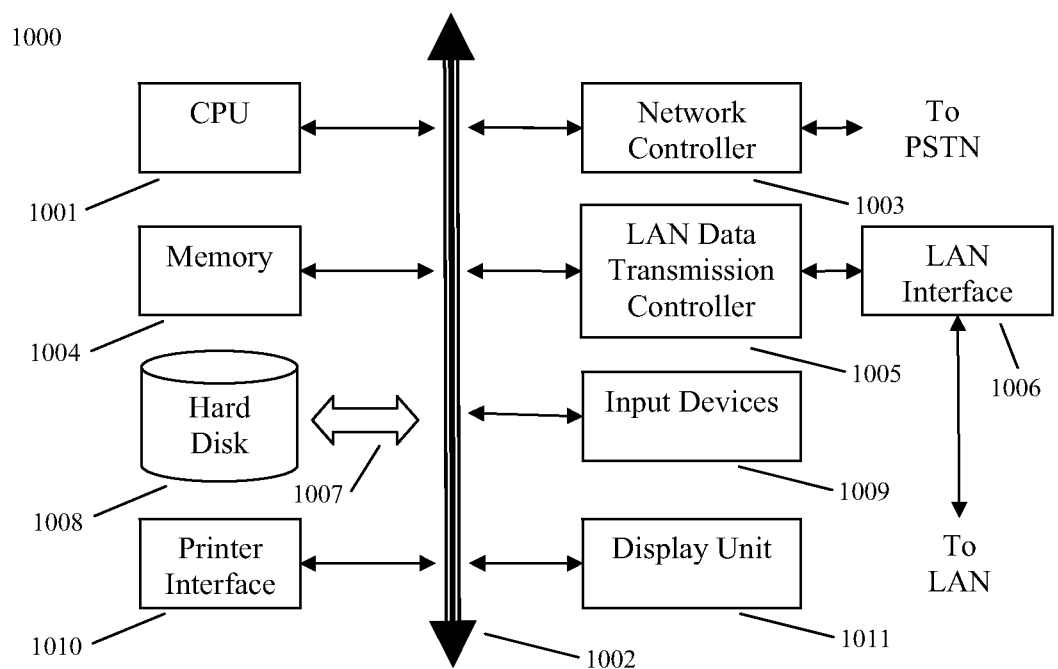
FIG. 3 shows an example of a computer system capable of implementing the method and apparatus according to embodiments of the present disclosure.

FIG. 3 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for managing allocation of electrical power, comprising:

selecting one or more power consuming entities for receiving a request to reduce electrical power usage based on data pertaining to past selections of entities for receiving requests to reduce power and a history of compliance with said requests;

generating a customized request to reduce power usage for each of the selected one or more power consuming entities;

receiving the generated customized request to reduce power usage at a corresponding power consuming entity;

evaluating a cost associated with complying with the received customized request to reduce power usage; and returning a commitment to comply with the received customized request to reduce power usage when the evaluated cost is within a threshold of acceptability and negotiating a new request to reduce power when the evaluated cost is greater than a threshold of acceptability, wherein the returned commitment includes a strategy for meeting the received customized request to reduce power usage.

2. The method of claim 1, wherein the request to reduce electrical power usage includes a request to curtail electrical consumption, to generate power independently, or to store electrical power at a first time and to release the stored electrical power at a second time that is later than the first time.

3. The method of claim 1, additionally comprising forecasting electrical power demand and identifying an insufficiency of available electrical power based on a forecasted demand and operating market conditions.

4. The method of claim 3, wherein forecasting the electrical power demand is performed using statistical data concerning past electrical power demand and forecasts concerning factors that affect power usage.

5. The method of claim 4, wherein said forecasts concerning factors that affect power usage include a weather forecast or economic conditions.

6. The method of claim 3, wherein forecasting the electrical power demand is performed automatically by a computer system based on data from a database of statistical data concerning past electrical power demand and recent weather report information retrieved over the Internet.

7. The method of claim 1, additionally comprising executing the commitment to comply with the request or executing the negotiated new request by curtailing power utilization, independently generating power, or storing and releasing power.

8. The method of claim 7, wherein execution of the commitment or the negotiated new request includes storing power within one or more electrical vehicles and releasing the stored power for general use.

9. The method of claim 1, wherein the request to reduce electrical power usage includes a request for the corresponding power consuming entity to become, for a predetermined period of time, a net power producing entity.

10. The method of claim 1, wherein said data pertaining to past selections of entities for receiving requests to reduce power and a history of compliance with said requests is retrieved from a database.

11. The method of claim 1, wherein generating the customized request to reduce power for each of the selected one or more power consuming entities is performed automatically using a computer system.

12. The method of claim 1, wherein said generated requests to reduce power for each of the selected one or more power consuming entities are transmitted in encoded form over an electronic network.

13. The method of claim 1, wherein said evaluating of the cost associated with complying with the received customized request to reduce power is performed automatically by a computer system.

14. The method of claim 1, wherein said negotiating the new request to reduce power when the evaluated cost is greater than a threshold of acceptability is performed automatically and electronically using a bidirectional line of data communication.

15. The method of claim 1, wherein the generated customized request to reduce power includes a quantity of load to shed or a maximum load utilization as a function of time.

16. A computer system comprising:

a processor; and a non-transitory, tangible, program storage medium, readable by the computer system, embodying a program of instructions executable by the processor to perform method steps for managing allocation of electrical power, the method comprising:

selecting one or more power consuming entities for receiving a request to reduce electrical power usage, based on data pertaining to past selections of entities for receiving requests to reduce power and a history of compliance with said request;

generating a customized request to reduce electrical power usage at a corresponding power consuming entity;

receiving the generated customized request to reduce electrical power usage at a corresponding power consuming entity;

evaluating a cost associated with complying with the received customized request to reduce electrical power usage; and returning a commitment to comply with the received customized request to reduce electrical power usage when the evaluated cost is within a threshold of acceptability and negotiating a new request to reduce electrical power usage, when the evaluated cost is greater than a threshold of acceptability, wherein the returned commitment includes a strategy for meeting the received customized request.

17. The computer system of claim 16, wherein the request to reduce electrical power usage includes a request to curtail electrical consumption, to generate power independently, or to store electrical power at a first time and to release the stored electrical power at a second time that is later than the first time.

18. The computer system of claim 16, additionally comprising forecasting electrical power demand and identifying an insufficiency of available electrical power based on a forecasted demand and operating market conditions.

\* \* \* \* \*